United States Patent
Stadtfeld et al.

(10) Patent No.: US 8,561,277 B2
(45) Date of Patent: Oct. 22, 2013

(54) RUNOUT COMPENSATION ON MACHINE TOOLS

(75) Inventors: Hermann J. Stadtfeld, Webster, NY (US); Joseph A. Courtney, Rochester, NY (US); Gary J. Kimmet, Rochester, NY (US)

(73) Assignee: The Gleason Works, Rochester, NY (US)

( * ) Notice: Subject to any disclaimer, the term of this patent is extended or adjusted under 35 U.S.C. 154(b) by 676 days.

(21) Appl. No.: 12/863,595

(22) PCT Filed: Mar. 16, 2009

(86) PCT No.: PCT/US2009/001645
§ 371 (c)(1),
(2), (4) Date: Jul. 20, 2010

(87) PCT Pub. No.: WO2009/114203
PCT Pub. Date: Sep. 17, 2009

(65) Prior Publication Data
US 2010/0290851 A1    Nov. 18, 2010

Related U.S. Application Data

(60) Provisional application No. 61/069,413, filed on Mar. 14, 2008.

(51) Int. Cl.
*B23Q 17/00* (2006.01)
*B21D 53/28* (2006.01)
*G01B 5/20* (2006.01)

(52) U.S. Cl.
USPC .............. 29/407.01; 29/407.05; 29/893.3; 33/201; 33/550

(58) Field of Classification Search
USPC .......... 29/407.01, 407.05, 893, 893.3; 33/201, 33/203, 203.18, 543, 550
See application file for complete search history.

(56) References Cited

U.S. PATENT DOCUMENTS

| 4,532,716 A * | 8/1985 | Steiner ........................... 33/201 |
| 7,018,278 B2 * | 3/2006 | Wirz ............................. 451/342 |
| 2002/0154961 A1 | 10/2002 | Stadtfeld et al. |

FOREIGN PATENT DOCUMENTS

| DE | 265823 A1 | 3/1989 |
| DE | 3831347 A1 | 4/1989 |
| WO | 97/37290 A1 | 10/1997 |

OTHER PUBLICATIONS

ISR and Written Opinion (in English) for PCT/US2009/001645.

* cited by examiner

*Primary Examiner* — Jermie Cozart
(74) *Attorney, Agent, or Firm* — Robert L. McDowell

(57) ABSTRACT

A method of determining axial and/or radial runout due to workholding equipment and compensating for such runout during machining of a gear wherein axial and/or radial runout compensations are executed during the machining of each individual tooth slot.

15 Claims, 3 Drawing Sheets

RUNOUT COMPENSATION ON MACHINE TOOLS

This application claims the benefit of U.S. Provisional Patent Application No. 61/069,413 filed Mar. 14, 2008, the entire disclosure of which is hereby incorporated by reference.

FIELD OF THE INVENTION

The present invention is directed to determining runout in machines, particularly gear manufacturing machines, due to the workholding equipment and compensating for such runout when machining a gear.

BACKGROUND OF THE INVENTION

In the production of gears, especially bevel gears, two types of processes are commonly employed, generating processes and non-generating processes.

Generating processes can be divided into two categories, face milling (intermittent indexing) and face hobbing (continuous indexing). In generating face milling processes, a rotating tool is fed into the workpiece to a predetermined depth. Once this depth is reached, the tool and workpiece are then rolled together in a predetermined relative rolling motion, known as the generating roll, as though the workpiece were rotating in mesh with a theoretical generating gear, the teeth of the theoretical generating gear being represented by the stock removing surfaces of the tool. The profile shape of the tooth is formed by relative motion of the tool and workpiece during the generating roll.

In generating face hobbing processes, the tool and workpiece rotate in a timed relationship and the tool is fed to depth thereby forming all tooth slots in a single plunge of the tool. After full depth is reached, the generating roll is commenced.

Non-generating processes, either intermittent indexing or continuous indexing, are those in which the profile shape of a tooth on a workpiece is produced directly from the profile shape on the tool. The tool is fed into the workpiece and the profile shape on the tool is imparted to the workpiece. While no generating roll is employed, the concept of a theoretical generating gear in the form of a theoretical "crown gear" is applicable in non-generating processes. The crown gear is that theoretical gear whose tooth surfaces are complementary with the tooth surfaces of the workpiece in non-generating processes. Therefore, the cutting blades on the tool represent the teeth of the theoretical crown gear when forming the tooth surfaces on the non-generated workpiece.

On machines for manufacturing gears, one or more compensations may be performed in order to eliminate tooth spacing deviations. Spacing deviations can be caused by tool wear, temperature change of tool, work and machine components. Those causes influence the relationship between tool and work whereby they are grouped in three categories (applies to face milling only, i.e. intermittent indexing):

- Rapid Effect—only the first few slots (e.g. the first three slots) of the total number of slots on a gear (e.g. 35 slots) are influenced;
- Medium term effect—during one revolution of a gear, the slots from the first to the last slot will be influenced; and
- Long term effect—the slot spacing characteristics of workpieces, in the course of a manufacturing shift, will be influenced.

Since workpieces are connected, via workholding equipment, to a machine work spindle in a non-rotational oriented way, spindle runout and runout between workholding and machine spindle have a random relationship to the spacing errors mentioned before. This is because the rotational stop position of work spindles in gear manufacturing machines is generally random. If the first slot of a bevel ring gear slot is cut on a cutting machine in the 9 o'clock position, then any spacing compensation bases on the absolute spindle orientation in that position. Commonly, the absolute work spindle rotational angle will be different from part to part. A compensation which addresses the rapid, medium and/or long term effect of spacing variation will not influence the component resulting from spindle or workholding runout. On the contrary, spindle or workholding runouts will adversely affect the result of a spacing error compensation.

Runout may be defined as a deviation from a desired form or orientation of a part's surface when rotated through 1 revolution (360 degrees). Two types of runout are commonly referred to: (1) radial runout, which is the deviation in a direction perpendicular to the axis of rotation of a body such as a workpiece or tool, and (2) axial runout, which is the amount along the axis of rotation by which the rotation of a body, such as a workpiece or tool, deviates from a plane.

If the machine work spindle is always oriented in the same rotational position at the beginning of the machining process for each part, then a measurement of the machined gear could capture some portion of the radial and axial run-out. However, in dry cutting for example, this would be compensated such as by a first-order ramp function from the first to the last tooth (based on the assumption that the medium term effect is caused by a work temperature increase from slot to slot and the fact that the last slot, which has the highest temperature, is adjacent to the first slot which had time to cool down during the time the remaining slots (e.g. 34) were cut). Such a compound correction of a mix of temperature effect as well as spindle and workholding runout can only be partially successful, and in most cases does not result in significant tooth spacing error reductions.

In gear grinding, spacing error compensation addresses, commonly, the rapid effect and the medium term effect in two ramps (superimposed to the axial and radial work position). This compensation minimizes the influence of grinding wheel wear between two dressings. A machine temperature compensation is generally done independently and addresses relevant machine axes depending on the individual machine design. The wheel wear compensation as described is not suited to compensate for workholding and spindle runout.

In the case of a non-oriented spindle and workholding arrangement, it has to be considered that every time the workholding fixture is removed and mounted back on the work spindle, the orientation between workholding fixture and spindle is different which will cause a phase shift in rotational orientation between spindle and workholding which will interfere with the attempt to apply the spacing error compensation that was developed previously for the subject job.

In the case of an oriented spindle having an oriented (keyed) positioning of the workholding fixture to the machine work spindle, it has to be considered that the seating of the workholding in the taper of the machine work spindle is different every time it is removed and remounted. This difference even increases in case of an oriented (keyed) position of the workholding. Small differences of only several microns will adversely affect the tooth spacing result. Some tooth spacing error compensations use single or multiple ramp functions or are developed for every slot individually.

Workholding runout delivers a sinusoidal tooth spacing error from the first to the last slot (radial runout) or a sinusoidal slot depth variation from the first to the last slot (axial runout).

After mounting a workholding fixture to a gear manufacturing machine, the runout (mostly radially) is measured with an indicator. In many cases, the workholding is rotated about 90° or 180° to find a more optimal relative angle to the work spindle in order to cancel out some or the entire runout. None of today's spacing error compensation methods are suited to capture the two types of runout, neither are they suited to reduce or eliminate them.

SUMMARY OF THE INVENTION

The present invention is directed to a method of determining axial and/or radial runout due to workholding equipment and compensating for such runout during machining of a gear wherein axial and/or radial runout compensations are executed during the machining of each individual tooth slot.

DETAILED DESCRIPTION OF THE PREFERRED EMBODIMENT

The preferred embodiments of the present invention will now be discussed with reference to the accompanying drawing Figures which represent the present invention by way of example only.

After mounting a workholding fixture to the work spindle of a gear manufacturing machine, a radial and face (axial) runout check using a mechanical indicator is usually performed. In the case of an unacceptable radial run-out, it is good machine set up practice to remove the connecting bolts, loosen the workholding from the taper and rotate it 180° (or about 180° depending on the bolt hole pattern). After properly torquing the holding bolts again, the runout check is repeated. In the case of no satisfactory result, the bolts are removed again and the workholding loosened from the taper and then rotated 90° depending on the bolt hole pattern) in clockwise or counter-clockwise direction in order to find the optimal combination between machine tool spindle and workholding unit.

The inventors discovered that the time consumption of such an intuitive runout reduction is substantial and in spite of this, the results are only partially successful. Besides, face runout cannot normally be influenced by the above described procedure.

Figure 1:
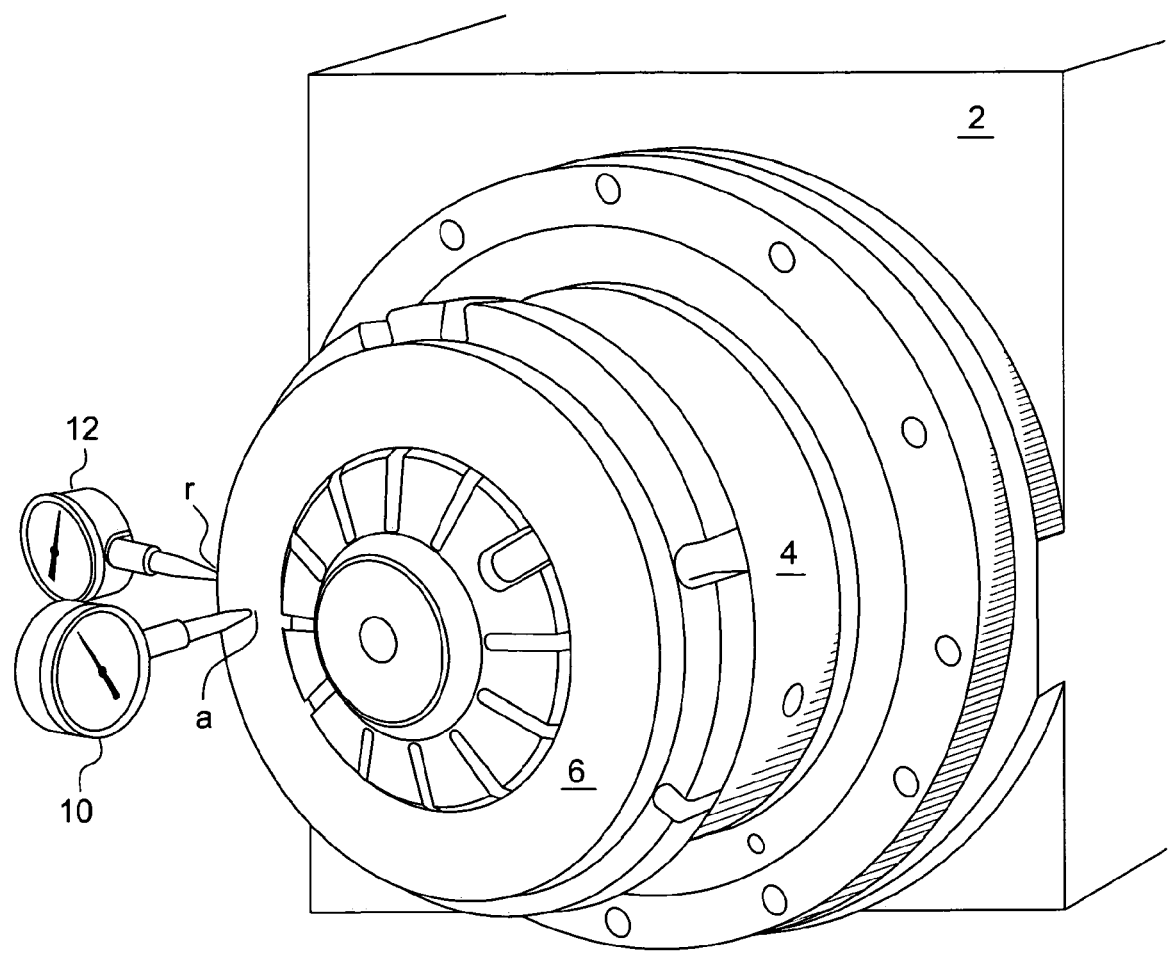
FIG. 1 illustrates axial and radial runout indicators at the 9 o'clock position of workholding equipment on a machine.

With reference to FIG. 1 which illustrates the workpiece spindle enclosure 2 of a machine, such as a gear cutting or grinding machine, having a workpiece spindle 4 and workholding equipment 6, the inventors propose to assemble workholding to the spindle once and take (1) an axial runout measurement with an indicator 10 or a machine built-in measuring probe and/or (2) a radial runout measurement with an indicator 12 or a machine built-in measuring probe preferably at the 9 o'clock position. The 9 o'clock position is where the material removal of most non-generated bevel ring gears in cutting or grinding is conducted. Generated bevel pinions, and gears, have their center roll position at or very close to the 9 o'clock position (FIG. 1). While two indicators 10, 12 are shown, a single indicator positionable to the appropriate measuring location is also contemplated.

Since the range of positions, from start roll to end roll in a generating process might cover an angular segment from the 8 o'clock position to the 10 o'clock position, for example, it is also suitable for generated bevel gears to base a runout measurement on the range of roll which is approximately the 9 o'clock position. However, it is preferred that the actual center of the cutting range of roll be determined and used instead of the approximated 9 o'clock position.

In the case of axial runout, (indicator 10 positioned at "a") a high and low point will be found, since true runout will cause a sinusoidal indicator reading, depending on the angle of rotation. If the measurement is done manually using an indicator, the measuring point should be at the center of the face width of bevel gear or pinion. The machine spindle is preferably rotated in set-up mode such as by jogging or similar manner. At the point of the highest indicator reading, $A_{max}$ in FIG. 2, the spindle rotation is stopped and the absolute angular position of the work spindle, $\alpha_{cmax}$, is recorded. Similarly, at the point of lowest indication reading, $A_{min}$ in FIG. 2, the spindle rotation is stopped and the absolute angular position, $\alpha_{cmin}$, of the workpiece spindle is recorded.

The indicator readings of the maximum and minimum amplitude are entered together with their corresponding work spindle angular positions into the machine control. A subroutine of the control software processes the input values:

$A_{max}$ = maximum indicator reading
$A_{min}$ = minimum indicator reading
$\alpha_{cmax}$ = work spindle angular position at point of $A_{max}$
$\alpha_{cmin}$ = work spindle angular position at point of $A_{min}$ In order to establish a sinusoidal function with a period of 360°, initially a check is done to determine if the difference between the corresponding angles of high and low point, minus 180°, is below some predetermined limit, $$\left(\frac{\Delta T_m}{2}\right)_{lim},$$

(e.g. $\Delta T_m = 30°$, therefore $\Delta T_m/2 = 30/2 = 15°$).

$$||\alpha_{Cmin} - \alpha_{Cmax}| - 180°| = \frac{\Delta T_m}{2} \quad (1)$$

where $\frac{\Delta T_m}{2}$ = angular difference of half a period of measured *runout* function vs. 180°.

$$\text{if } \frac{\Delta T_m}{2} \geq \left(\frac{\Delta T_m}{2}\right)_{lim} \rightarrow \text{ compensation not applicable} \quad (2)$$

$$\text{if } \frac{\Delta T_m}{2} < \left(\frac{\Delta T_m}{2}\right)_{lim} \rightarrow \text{ proceed} \quad (3)$$

Figure 2:
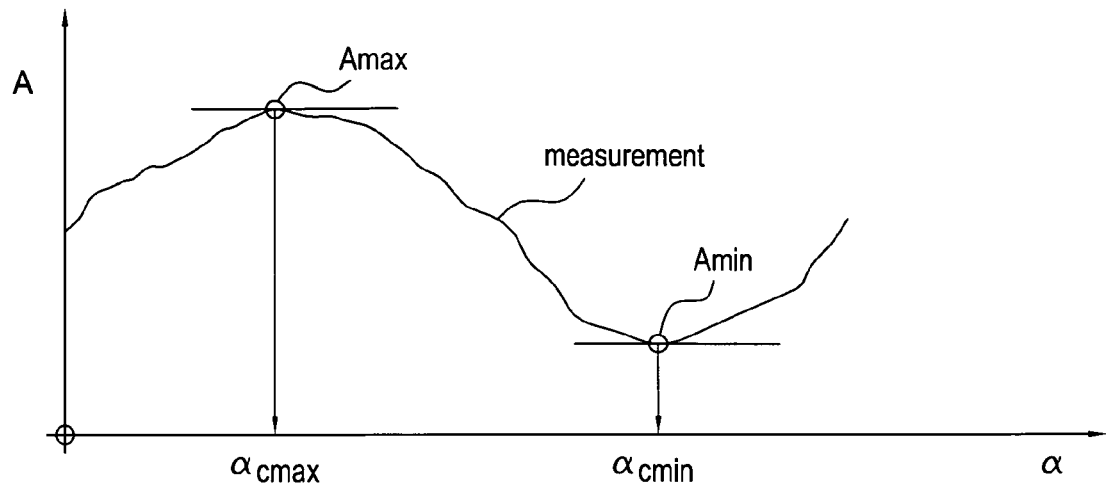
FIG. 2 illustrates an example of measured axial runout for one revolution of the workholding equipment.
Figure 3:
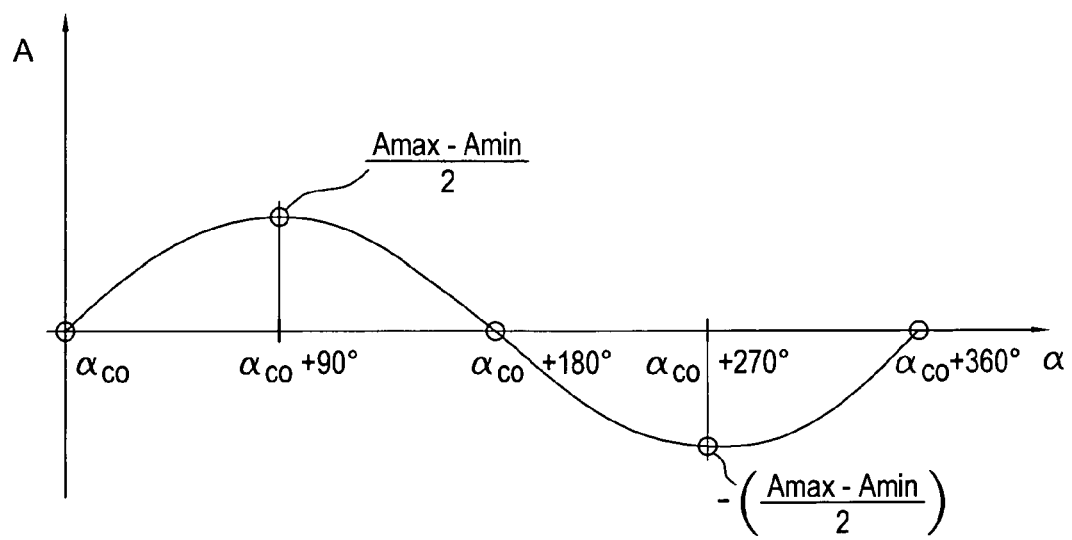
FIG. 3 shows a conversion of the measured axial runout of FIG. 2 to an idealized sinusoidal function.

FIG. 2 shows the true axial runout function. The function in FIG. 3 is a conversion of the true runout function into an idealized sinusoidal function. The abscissa in the diagram of FIG. 3 is found in the middle between $A_{max}$ and $A_{min}$. The value of work rotational angle at the origin of the coordinate system in FIG. 3 ($\alpha_{CO}$) is found with the following formula:

$$\alpha_{CO} = \frac{\alpha_{Cmin} - \alpha_{Cmax}}{2} - 180° \quad (4)$$

The axial compensation function, $\Delta A_{axial}$, is calculated:

$$\Delta A_{axial} = a\sin(b + c\alpha_{ci}) \quad (5)$$

where:

$$a = \frac{A_{max} - A_{min}}{2} \quad (6)$$

$A_{max}$=maximal indicator reading
$A_{min}$=minimal indicator reading $$b = -\alpha_{CO}(\text{phase shift}) \quad (7)$$

$$c = 1 (\text{one period each } 360°) \quad (8)$$

$\alpha_{ci}$=angular slot position A axis

While the above method is preferred to establish the sinusoidal function, other methods of establishing a sinusoidal function are also contemplated, such as, for example, the least squared error method to define the best approximation between a measured harmonic function and a precise sinusoidal function.

To improve the accuracy of this correction, the radius of the measurement (given by the workholding) can be related to the mean radius of the workpiece (ring gear or pinion) by:

$$A^*_{max} = [R_{mean\ gear}/R_{workholding}] \times A_{max} \quad (9)$$

$$A^*_{min} = [R_{mean\ gear}/R_{workholding}] \times A_{min} \quad (10)$$

where:
$R_{mean\ gear}$=mean radius of workpiece; and
$R_{workholding}$=mean radius of workholding equipment.
The results from Equations (9) and/or (10) can be entered into Equation (6) above.

This approach un-distorts the measured function which is useful in order to allow a slot by slot compensation with only two measurement values. The compensation is executed during the machining of slots such that for the center roll position (generated) or for the plunge position (non-generated) of every slot, the work axis angular position $\alpha_{ci}$ is entered into formula (5) whereby the resulting $\Delta A_{axial}$ is added using the correct sign to a machine axis which is oriented in the axial work spindle direction (such as the X axis shown in U.S. Pat. No. 6,712,566, for example). In case of different machine constructions, the compensation value may be split in two or more components in order to achieve a compensation in axial work axis direction.

The approach of non-distorting the measured function is also very useful from the viewpoint that, for example, if the face or the radial seating surface of a workholding has a distorted sinusoidal shape, a workpiece which is perfectly flat (and infinitely stiff) will, due to the axial clamping onto the workholding, average the inaccuracies and undistort the function. The infinitely stiff workpiece will result in sinusoidal runout functions of the clamping. Therefore, a function different than an undistorted sinusoidal function would reduce the significance and accuracy of a runout correction.

Calculating and adding of the corrective value $\Delta A$ is most preferably done for every slot individually. In case of oriented work spindle position (at the beginning of machining) the values $\Delta A$ for every index can be pre-calculated and stored previous to the machining, which will save real time processor time during the machining process.

For a radial run-out compensation the indicator 12 positioned at "r" in FIG. 1 is used. The spindle is rotated in jog mode and the indicator maximal reading (high point) is recorded together with the corresponding work spindle rotation angle, which can be displayed on the control screen. Also, the minimal indicator reading (low point) is recorded together with the corresponding angular work spindle position.

Figure 4:
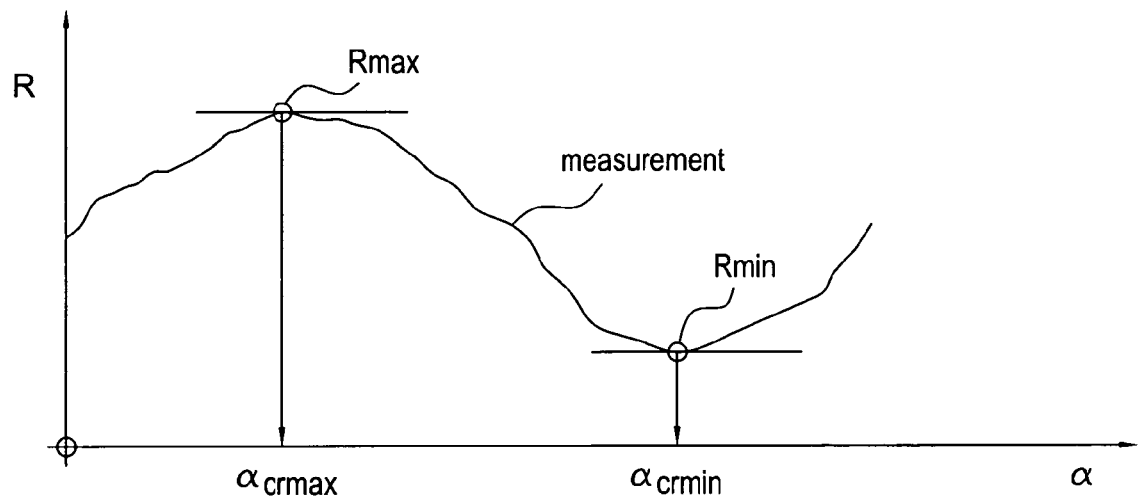
FIG. 4 illustrates an example of measured radial runout for one revolution of the workholding equipment.

FIG. 4 shows the true radial run-out as measured, over the angular work spindle position. In order to establish a sinusoidal function with a period of 360°, at first a check is done to determine if the difference between the corresponding angles of low and high point to 180° is below some predetermined limit, $$\left(\frac{\Delta T_{mr}}{2}\right)_{lim},$$

(e.g. $\Delta T_{mr} = 30°$, therefore $\Delta T_{mr}/2 = 30/2 = 15°$, usually the same limit as described above with respect to $$\left(\frac{\Delta T_m}{2}\right)_{lim},$$

i.e., 15° in this example).

$$||\alpha_{crmin} - \alpha_{crmax}| - 180°| = \frac{\Delta T_{mr}}{2} \quad (11)$$

where $\frac{\Delta T_{mr}}{2}$ = angular difference of half a period of measured *runout* function vs. 180°.

$$\text{if } \frac{\Delta T_{mr}}{2} \geq \left(\frac{\Delta T_{mr}}{2}\right)_{lim} \rightarrow \text{compensation not applicable} \quad (12)$$

$$\text{if } \frac{\Delta T_{mr}}{2} < \left(\frac{\Delta T_{mr}}{2}\right)_{lim} \rightarrow \text{proceed} \quad (13)$$

Figure 5:
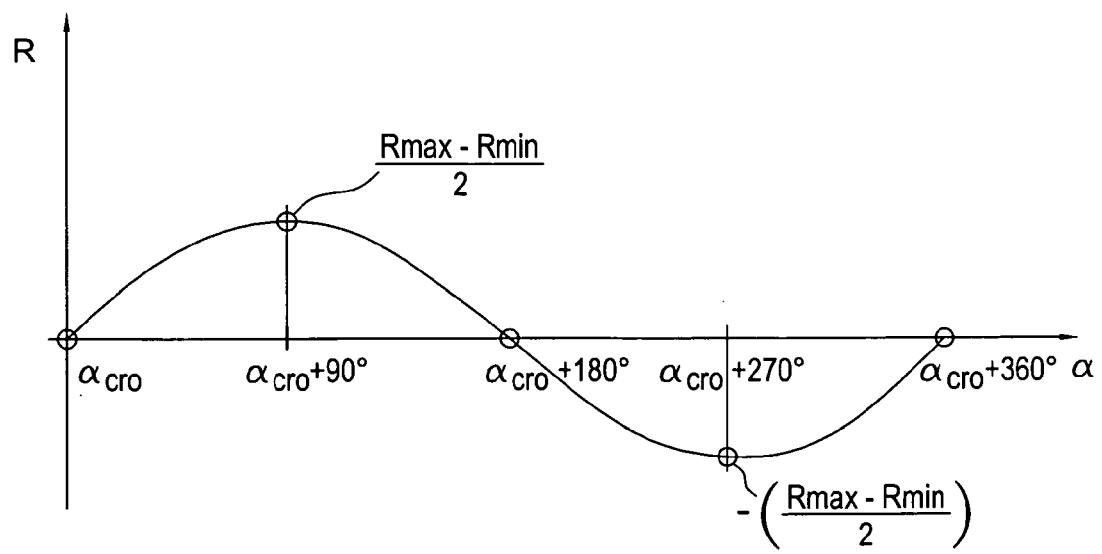
FIG. 5 shows a conversion of the measured radial runout of FIG. 4 to an idealized sinusoidal function.

The true sinusoidal function shown in FIG. 5 is calculated:

$$\Delta R_{radial} = d\sin(e + f\alpha_{cri}) \quad (14)$$

where:

$$d = \frac{R_{max} - R_{min}}{2} \quad (15)$$

$R_{max}$=maximal indicator reading
$R_{min}$=minimal indicator reading $$E = -\alpha_{cro} \text{ (phase shift)} \quad (16)$$

$$\alpha_{cro} = \frac{\alpha_{crmin} - \alpha_{crmax}}{2} - 180° \quad (17)$$

f=1(one period each 360°)

$\alpha_{cri}$=angular slot position A axis) (18)

In the case of a double sinusoidal function or in case of a fuzzy indicator reading which is not clearly repeating with one period per work spindle revolution, the manual measurement is not suitable for an adequate compensation (radially as well as axially).

The compensation is executed during the machining of slots such that for the center roll position (generated) as for the plunge position (non-generated) of every slot, the work axis angular position, $\alpha_{cri}$, is entered into Equation (14), whereby the resulting $\Delta R_{radial}$ is added using the correct sign to a machine axis which is oriented in the horizontal, radial work spindle direction (such as the Z axis shown in U.S. Pat. No. 6,712,566, for example). In case of a different machine construction the compensation value may be split in two or more components in order to achieve a compensation in the horizontal oriented radial work axis direction.

Calculating and adding of the corrective value $\Delta R$ is most preferably done for every slot individually. In case of oriented work spindle position (at the beginning of machining) the values $\Delta R$ for every index can be pre-calculated and stored previous to the machining, which will save real time processor time during the machining process.

On machines which have measuring probes, which can be used for stock division, stock mapping or flank form measurements, it is possible to measure axial runout and radial runout fully automatically and relate several hundred or even several thousand run-out readings to angular work spindle positions, in order to establish the graphs of FIG. 2 and FIG. 4 and store them in some array. In the case of oriented work spindle position (at the beginning of machining) it would only be necessary to store corrective axial and radial values for every gear slot.

In the case of automated measurement, the kind of runout function (e.g. sinusoidal or otherwise) and the length of the period (360° of the work spindle rotation or a multiple of this) is acceptable and has no influence on the accuracy and function of the runout correction.

The present inventive method is applicable to pinions and ring gears. In the case of continuous indexing (face hobbing), an axis compensation, using a harmonic phase-oriented sinusoidal function calculated according to the above discussion, is also possible. The functions of FIGS. 3 and 5 are applied to the appropriate machine axis and are repeated for every revolution of the workpiece. Modern, highly dynamic control systems are capable of accommodating such compensation up to the RPM limits of the control system.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of compensating for runout of workholding equipment positioned on a workpiece spindle of a gear manufacturing machine, said gear manufacturing machine comprising a plurality of computer controlled axes of motion, said method comprising:
    determining the runout of the workholding equipment;
    determining the angular orientation of the runout relative to the workpiece spindle;
    determining a compensation amount for each tooth slot location of a gear workpiece to be machined, said compensation amount being based on said runout and the gear workpiece tooth slot rotational position on said spindle for said each tooth slot, said compensation amount being an amount of relative movement of said gear workpiece along one or more of said axes of motion during machining of said each tooth slot in order to compensate slot-by-slot for the effect of workholding runout on the workpiece.

2. The method of claim 1 wherein said determining the runout of the workholding equipment comprises measuring at least one of axial and radial runout.

3. The method of claim 2 wherein said measuring occurs between the 8 o'clock and the 10 o'clock position on the workholding equipment.

4. The method of claim 3 wherein said measuring occurs at about the 9 o'clock position on the workholding equipment.

5. The method of claim 1 wherein said determining the runout of the workholding equipment comprises identifying a maximum runout amount and a minimum runout amount.

6. The method of claim 5 wherein said compensation amount is determined based on said maximum and minimum runout amounts and the gear workpiece tooth slot rotational position on said spindle for said each tooth slot, said compensation amount being an amount of relative movement during machining of said gear workpiece along one or more of said axes of motion for said each tooth slot in order to compensate slot-by-slot for the effect of workholding runout on the workpiece.

7. The method of claim 5 wherein an angular difference is determined between said maximum runout amount and said minimum runout amount, said angular difference being compared to a predetermined difference limit, and said method being aborted if said angular difference is below said predetermined difference limit.

8. The method of claim 5 wherein the maximum runout amount and the minimum runout amount are adjusted by multiplying by a ratio, said ratio being defined as: mean workpiece radius/radius of the workholding equipment.

9. The method of claim 1 wherein said determining the runout comprises measuring the runout with at least one measurement indicator.

10. The method of claim 1 wherein said determining the runout comprises measuring the runout with at least one machine built-in measuring probe.

11. The method of claim 1 wherein subsequent to determining the compensation for each tooth slot of a gear workpiece, a plurality of workpieces are machined by a single indexing process wherein the amount of relative movement of said gear workpiece along one or more of said axes of motion during machining of said each tooth slot in order to compensate slot-by-slot for the effect of workholding runout is repeated for each workpiece.

12. The method of claim 1 wherein subsequent to determining the compensation for each tooth slot of a gear workpiece, a plurality of workpieces are machined by a continuous indexing process wherein the amount of relative movement of said gear workpiece along one or more of said axes of motion during machining of said each tooth slot in order to compensate slot-by-slot for the effect of workholding runout is repeated for each revolution of the workpiece.

13. The method of claim 1 wherein the gear workpiece comprises one of ring gears and pinions.

14. The method of claim 1 wherein said runout is represented as a sinusoidal function.

15. The method of claim 1 wherein subsequent to determining the compensation for each tooth slot of a gear workpiece, a plurality of workpieces are machined by one of a generated or non-generated process.

* * * * *